US011908615B2

(12) United States Patent
Amer et al.

(10) Patent No.: US 11,908,615 B2
(45) Date of Patent: Feb. 20, 2024

(54) METHOD FOR MANUFACTURING COMMON MODE OR DIFFERENTIAL MODE INDUCTOR AND COMMON MODE OR DIFFERENTIAL MODE INDUCTOR

(71) Applicant: Delta Electronics (Norway) AS, Drammen (NO)

(72) Inventors: Christine Amer, Drammen (NO); Håkon Hafnor, Drammen (NO); Jan Tore Brastad, Drammen (NO); Kjetil Hagen, Drammen (NO)

(73) Assignee: Delta Electronics (Norway) AS, Drammen (NO)

( * ) Notice: Subject to any disclaimer, the term of this patent is extended or adjusted under 35 U.S.C. 154(b) by 73 days.

(21) Appl. No.: 17/362,866

(22) Filed: Jun. 29, 2021

(65) Prior Publication Data

US 2022/0028604 A1 Jan. 27, 2022

(30) Foreign Application Priority Data

Jul. 3, 2020 (EP) .................................... 20183915

(51) Int. Cl.
*H01F 17/06* (2006.01)
*H01F 27/26* (2006.01)
(Continued)

(52) U.S. Cl.
CPC ........... *H01F 37/00* (2013.01); *H01F 27/027* (2013.01); *H01F 27/06* (2013.01); *H01F 27/324* (2013.01);
(Continued)

(58) Field of Classification Search
CPC ........ H01F 37/00; H01F 27/027; H01F 27/06; H01F 27/324; H01F 41/08;
(Continued)

(56) References Cited

U.S. PATENT DOCUMENTS 4,833,436 A * 5/1989 Martin .................. H01F 27/306
336/185
6,690,257 B2 2/2004 Kobayashi
(Continued)

FOREIGN PATENT DOCUMENTS

CA 2591103 C 12/2007
CN 102376417 A 3/2012
(Continued)

OTHER PUBLICATIONS

Extended European Search Report.
(Continued)

*Primary Examiner* — Tuyen T Nguyen
(74) *Attorney, Agent, or Firm* — J.C. PATENTS

(57) ABSTRACT

The present disclosure provides a common or differential mode inductor for connection to a printed circuit board. The inductor includes a core, a first coil including a first insulated wire wound with a number of turns around the core, and a supporting device for supporting the core and the first coil. The supporting device includes a base element having a PCB contacting surface, and a first alignment element having a proximal end connected to the base element and a distal end provided at a distance from the PCB contacting surface, wherein the distal end is defining an alignment plane. The core has a first end plane facing the alignment plane and a second end plane, wherein the first end plane is facing the alignment plane. The second end plane is facing the base element.

8 Claims, 18 Drawing Sheets

(51) Int. Cl.

| | |
|---|---|
| ***H01F 37/00*** | (2006.01) |
| ***H01F 27/32*** | (2006.01) |
| ***H01F 27/06*** | (2006.01) |
| ***H01F 41/08*** | (2006.01) |
| ***H01F 27/02*** | (2006.01) |

(52) U.S. Cl.
CPC ....... *H01F 41/08* (2013.01); *H01F 2027/065* (2013.01)

(58) Field of Classification Search
CPC ........... H01F 2027/065; H01F 27/2828; H01F 27/2895; H01F 2017/0093
See application file for complete search history.

(56) References Cited

U.S. PATENT DOCUMENTS

| | | | | |
|---|---|---|---|---|
| 7,868,722 | B2 * | 1/2011 | Hwang | H01F 27/266 336/200 |
| 7,898,822 | B2 | 3/2011 | Feist | |
| 8,253,521 | B2 | 8/2012 | Brennan | |
| 2009/0278650 | A1 | 11/2009 | Shieh | |

FOREIGN PATENT DOCUMENTS

| | | | | |
|---|---|---|---|---|
| CN | 102856036 | A | | 1/2013 |
| CN | 205959739 | U | | 2/2017 |
| CN | 207052391 | | | 2/2018 |
| CN | 209133298 | U | | 7/2019 |
| CN | 110415934 | A | | 11/2019 |
| CN | 209980897 | U | | 1/2020 |
| DE | 1020180109565 | A1 | | 10/2019 |
| EP | 2537166 | B1 | | 12/2019 |
| JP | S60163710 | U | * | 10/1985 |
| JP | H06132146 | A | | 5/1994 |

OTHER PUBLICATIONS

Internal Search Report.
First Office Action of the parallel application CN202110711144.8.
“Principles and Design on Integrated EMI Filters”, Transactions of China Electrotechnical Society, vol. 26, No. 9, Sep. 2011, pp. 160-166.

* cited by examiner

METHOD FOR MANUFACTURING COMMON MODE OR DIFFERENTIAL MODE INDUCTOR AND COMMON MODE OR DIFFERENTIAL MODE INDUCTOR

CROSS-REFERENCE TO RELATED APPLICATION

This application claims priority to European Patent Application No. 20183915.6, filed on Jul. 3, 2020, which is hereby incorporated by reference in its entirety.

TECHNICAL FIELD

The present disclosure relates to a method of manufacturing a common mode inductor or differential mode inductor. The present disclosure also relates to such a common mode or differential mode inductor.

BACKGROUND

Outdoor power supply systems are commonly used to supply power to outdoor power consuming systems. One example of such outdoor power consuming systems is telecom equipment, such as telecom base stations. Such a telecom base station is typically supplied with a 48V direct current (DC) voltage delivered from a power supply system located adjacent to, or in the proximity of, the base station.

The power supply system may include an alternating current (AC)/DC converter for converting an AC voltage from the AC mains (or a fossil-fueled AC generator etc.).

Alternatively, the power supply system may include a DC/DC converter for converting a DC voltage (from a solar panel system, or another type of DC power source).

The power supply system may further include rechargeable batteries to provide UPS (uninterrupted power supply) functionality.

The outdoor power supply system further includes a cabinet in which electrical equipment is protected from the environment. The cabinet provides protection from fine particles (dust, sand etc.) and humidity (rain, snow etc.). FIG. 1 shows one such prior art cabinet, referred to as the Type 4 Outdoor cabinet and described in the datasheet "Outdoor telecom power cabinet (Type 4)" issued by Eltek ASA. This cabinet has an IP code 55 (Ingress Protection code as defined in IEC standard 60529). Power cables, such as AC or DC input power cables and DC output cables, are guided between the inside and outside of the cabinet through its top side or bottom side.

FIG. 2*a* shows a prior art AC/DC converter module referred to as the Eltek Flatpack 2 SHE converter and described in the brochure "SHE is so cool: Efficiency taken to the next level". There are today two versions, supplying 2000 W and 3000 W respectively. The converter has a power efficiency of about 98%. The electrical and electronic components of the converter module is provided within a cover, as indicated in FIG. 2*a*. The purpose of the cover is to provide protection against electrical shock and for EMI purposes. One or several such converters may be mounted in a rack within the cabinet shown in FIG. 1.

As the converter and other parts of the power supply system generates heat, a cooling system is needed to cool the air within the cabinet. The cooling system may be a heat exchanger, an air conditioner or a fan-filter. The cooling system has several disadvantages; it reduces the overall power efficiency, it increases the size of the cabinet, it increases the costs of the overall power supply system and it reduces the reliability of the overall system. As shown in FIG. 2*a*, also the converter itself has a fan on its front side to provide a cooling air flow through the converter.

FIG. 2*b* shows a prior art AC/DC converter where a power converter module as in FIG. 2*a* is provided within a metal housing with cooling fins. The housing has an IP65 rating. This AC/DC converter is marketed by Eltek ASA under the name "Chameleon" and is described in the datasheet "Chameleon Standalone 48/650 HE". This converter is passively cooled and hence has a reduced cost due to the lack of an active cooling system. The housing is made of an extruded aluminum alloy, where the printed circuit board (PCB) with all its electrical components is inserted into either the top end opening or the bottom end opening of the housing. The end openings are thereafter closed by a top cover and a bottom cover, the bottom cover including cable connectors for input/output power. This AC/DC converter has an increased manufacturing cost due to the cumbersome assembly procedure.

FIG. 2*c* shows a prior art AC/DC power system including two converters of FIG. 2*b* connected together as a power core, and the system further includes a battery unit. This AC/DC power system is marketed by Eltek ASA and is described in the datasheet "Chameleon PS Systems—Compact-based Power Supply System". It is also vulnerable for theft and vandalism. The system is also limited in how much power it can supply. This system also has an increased manufacturing cost.

The converter module of FIGS. 2*a* and 2*b* typically has three common mode (CM) inductors. A common mode inductor includes at least two coils of insulated copper wire wound on a single, typically ring-shaped, core. Its purpose is to suppress electromagnetic interference (EMI) and noise. Today, such CM inductors are typically produced manually, as this is cheaper than using automatic production methods. One reason is the wire dimension of the coil, which is typically 1.5 mm-1.8 mm wire diameter for the above power ranges. Consequently, the wire is relatively rigid and hence difficult to wind around the core. The manual production method results in high tolerances (i.e. its large variations in the dimensions of each CM inductor), which makes it difficult to robotize the mounting and soldering process of the CM inductor to the printed circuit board.

Another type of inductor which may be used in such converters is the differential mode (DM) inductor. The DM inductor has typically one coil of insulated copper wire wound on a single, typically ring-shaped core. CM inductors typically have high permeability cores with low saturation capability, while DM cores have lower permeability materials, with higher saturation capability.

One object of the embodiment of the present disclosure is to reduce tolerances during manufacturing of CM and DM inductors. This will reduce scrapping, and hence reduce costs per produced usable CM and DM inductor. This will also make it easier to robotize the mounting and soldering process. In addition, the object of the embodiment of the present disclosure is to improve how such CM and DM inductors can be cooled.

SUMMARY

The present disclosure relates to a common mode or differential mode inductor. One embodiment of the present disclosure provides a common mode or differential mode inductor for connection to a printed circuit board (PCB), wherein the inductor includes:

a core;

a first coil including a first insulated wire wound with a number of turns around the core;

a supporting device for supporting the core and the first coil;

wherein the supporting device includes:

a base element having a PCB contacting surface; and an first alignment element having a proximal end connected to the base element and a distal end provided at a distance from the PCB contacting surface, where the distal end is defining an alignment plane;

wherein the core has a first end plane and a second end plane, wherein the first end plane is facing the alignment plane; wherein the second end plane is facing the base element;

wherein each turn of the first insulated wire has a point furthest from the first end plane a distance in a normal direction towards the alignment plane, wherein the turn having the largest distance from the first end plane is aligned with the alignment plane.

In one embodiment, the core may be cylindrical or torus-shaped, it may be shaped like a rectangular or oval toroid. It may also be shaped as a cube having an opening through the cube.

In one embodiment, the base element includes wire guides for guiding ends of the first insulated wire of the first coil with respect to the supporting device.

In one embodiment, the ends of the first insulated wire are slidingly engaged with the wire guides.

In one embodiment, the ends of the insulated wire of the first coil are protruding from the base element in a direction away from the alignment plane. The ends are sufficiently long to penetrate openings of the printed circuit board and to be soldered to the side of the printed circuit board being opposite of the supporting device.

In one embodiment, the longitudinal center axis of the core is oriented perpendicular to the PCB contacting surface.

In one embodiment, the inductor further includes:

a second coil including a second insulated wire wound with a number of turns around the core;

wherein each turn of the second insulated wire has a point furthest from the first end plane a distance in a normal direction towards the alignment plane, wherein the turn having the largest distance from the first end plane is aligned with the alignment plane.

In one embodiment, ends of the second insulated wire of the second coil are slidingly engaged with the wire guides.

In one embodiment, the inductor includes a coil separation element for separating the first coil from the second coil. The coil separation element sets a separation distance between turns of the first coil from turns of the second coil.

In one embodiment, the coil separation element is provided at least partially inside the opening of the core. In one embodiment, the entire coil separation element is provided between the alignment plane and the base element.

In one embodiment, the coil separation element includes an aligning surface aligned with the alignment plane. In one embodiment, the coil separation element is connected to, or provided as part of, the supporting device.

In one embodiment, the core, the first coil and/or the second coil are fastened to the supporting device by an adhesive.

As the coil or the coils are wound around the core, the adhesive will also fasten the core to the supporting device. The adhesive may also fasten the coil separation element to the coil or coils and/or to the supporting device.

In one embodiment, the supporting device further includes:

a second alignment element having a proximal end connected to the base element and a distal end provided at a second distance from the PCB contacting surface, where the distal end of the first alignment element and the distal end of the second alignment element together are defining an alignment plane.

In one embodiment, this second distance between the PCB contacting surface and the distal end of the second alignment element is equal to the distance between the PCB contacting surface and the distal end of the first alignment element. In this case, the alignment plane is parallel to the PCB contacting surface and hence the plane of the printed circuit board.

The distal end of the first alignment element and the distal end of the second alignment element may be parallel lines. Alternatively, the distal end of the first alignment element may be a line and the distal end of the second alignment element may be a point not on that line or vice versa.

In one embodiment, the supporting device includes one single alignment element, wherein the distal end of the one single first alignment element includes an end surface defining the alignment plane.

In one embodiment, the one single alignment element is provided through the opening of the core. In one embodiment, the end surface defining the alignment plane is substantially circular.

In one embodiment, the supporting device further includes:

a third alignment element having a proximal end connected to the base element and a distal end provided at third distance from the PCB contacting surface, where the distal end of the first alignment element, the distal end of the second alignment element and the distal end of the third alignment element together are defining the alignment plane.

In one embodiment, this third distance between the PCB contacting surface and the distal end of the third alignment element is equal to the distance between the PCB contacting surface and the distal end of the first alignment element and also equal to the distance between the PCB contacting surface and the distal end of the second alignment element. Again, this case the alignment plane is parallel to the PCB contacting surface and hence the plane of the printed circuit board.

In one embodiment, the supporting device is made as one, single body. Alternatively, the base element and alignment element are made as separate bodies fixed to, or secured to, each other.

In one embodiment, the supporting device is made of a plastic material.

In one embodiment, one purpose of the supporting device is to support the core and the coil with respect to the printed circuit board. One further purpose is to support the core and the coil in a preferred position with respect to the printed circuit board and with respect to a cooling surface, the cooling surface being located at a distance from the printed circuit board.

The present disclosure also relates to a method for manufacturing a common mode inductor or a differential mode inductor. One embodiment of the present disclosure provides a method for manufacturing a common mode inductor or a differential mode inductor including the steps of:

a) providing a supporting device including a base element having a PCB contacting surface; and a first alignment element having a proximal end connected to the base element and a distal end provided at a distance from the base element, where the distal end is defining an alignment plane;

b) providing a core; wherein the core has a first end plane and a second end plane;

c) winding a first insulated wire a number of turns around the core, and forming a first coil around the core;

d) supporting the core and the first coil on the supporting device by orienting the first end plane facing towards the alignment plane and the second end plane facing towards the base element;

e) aligning the alignment plane with a planar surface;

f) pushing the core and the first coil towards and abutting the planar surface;

g) securing the core and the first coil with respect to the supporting device.

In one embodiment, the step of supporting the core and the first coil on the supporting device includes the step of:

inserting ends of the first insulated wire of the first coil into wire guides of the supporting device.

In one embodiment, the ends of the first insulated wire are slidingly engaged with the wire guides.

In one embodiment, the step of securing the core and the first coil with respect to the supporting device includes the step of:

adhering the core and the first coil to the supporting device by means of an adhesive.

In one embodiment, the adhesive is in contact with the core, the first coil and the supporting device. However, as the wire of the first coil is wounded around the core, it is sufficient that the adhesive is in contact between the first coil and the supporting device, as this indirectly will cause the core to be adhered to the supporting device.

In one embodiment, the step of pushing the core and the first coil includes:

pushing the core and the first coil towards the planar surface relative to the supporting device.

In one embodiment, each turn of the first insulated wire has a point furthest from the first end plane a distance in a normal direction towards the alignment plane, wherein the step of pushing the core and the first coil includes:

aligning the turn having the largest distance from the first end plane with the alignment plane.

In one embodiment, the step of pushing the core and the first coil includes:

reducing the distance of at least one of the turns of the first insulated wire.

According to the above inductor and method for manufacturing of such an inductor, it is achieved that none of the turns of the coil is protruding further away from the first end plane than the alignment plane. Hence, all inductors will fit in its assigned position between the printed circuit board and an outer housing, making robot manufacturing simpler.

Preferably, the outer housing is made of a heat conducting material, and hence, the housing serves the purpose of transporting heat away from the inductor. Typically, a thermally conducting material, for example a thermally conducting pad, a thermally conducting gap filler or a solidified liquid gap filler, is used between the inductor and the outer housing. Due to the alignment of the coil with the alignment plane, it is achieved that fewer and/or thinner pads may be used. Moreover, it is achieved that the variation between different inductors is reduced and hence the variation in required pad thickness is reduced.

The present disclosure also relates to an electric circuit system. One embodiment of the present disclosure provides an electric circuit system including:

a protective housing;

a printed circuit board mounted within the housing;

a common mode or differential mode inductor according to the above or an inductor manufactured according to the method above, the inductor being electrically connected the printed circuit board;

a thermally conducting material located substantially in the alignment plane between the inductor and the protective housing.

BRIEF DESCRIPTION OF DRAWINGS

Embodiments of the disclosure will now be described in detail with respect to the enclosed drawings, wherein.

DESCRIPTION OF EMBODIMENTS

Figure 1:
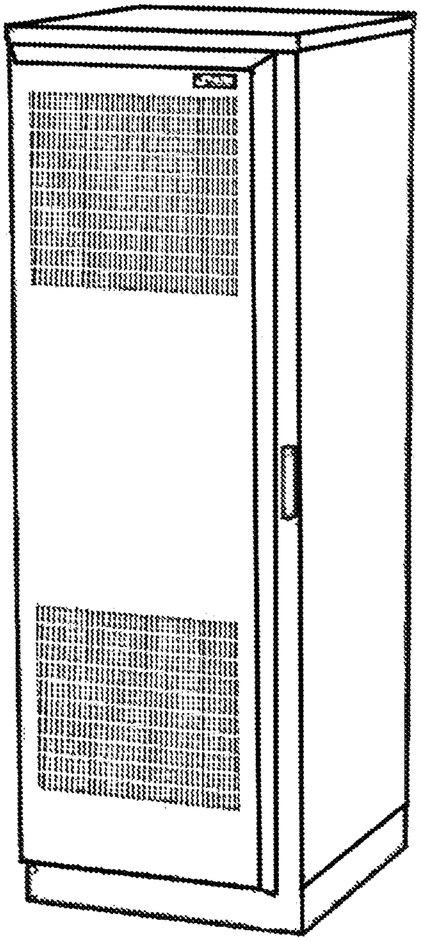
Fig. 1 (Prior art)
FIG. 1 shows a prior art housing of an outdoor power supply system, the housing being a cabinet.
Figure 2A:
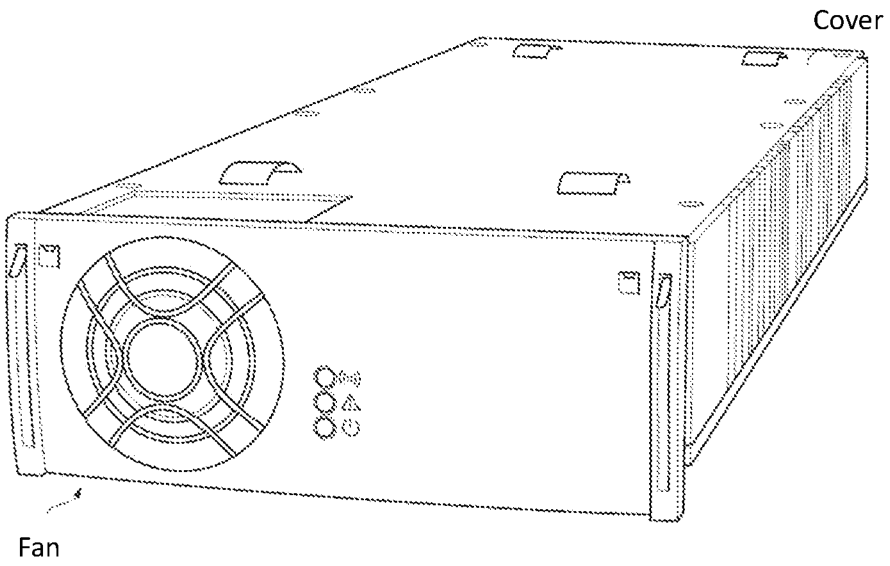
Fig. 2a (Prior art)
FIG. 2*a* illustrates a converter module used in the power supply system of FIG. 1.
Figure 2B:
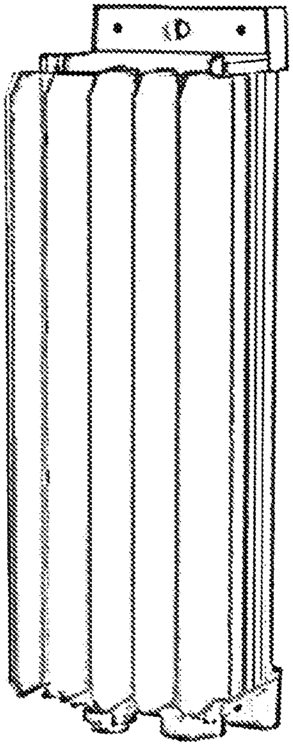
Fig. 2b (Prior art)
FIG. 2*b* illustrates a prior art passively cooled converter module.
Figure 2C:
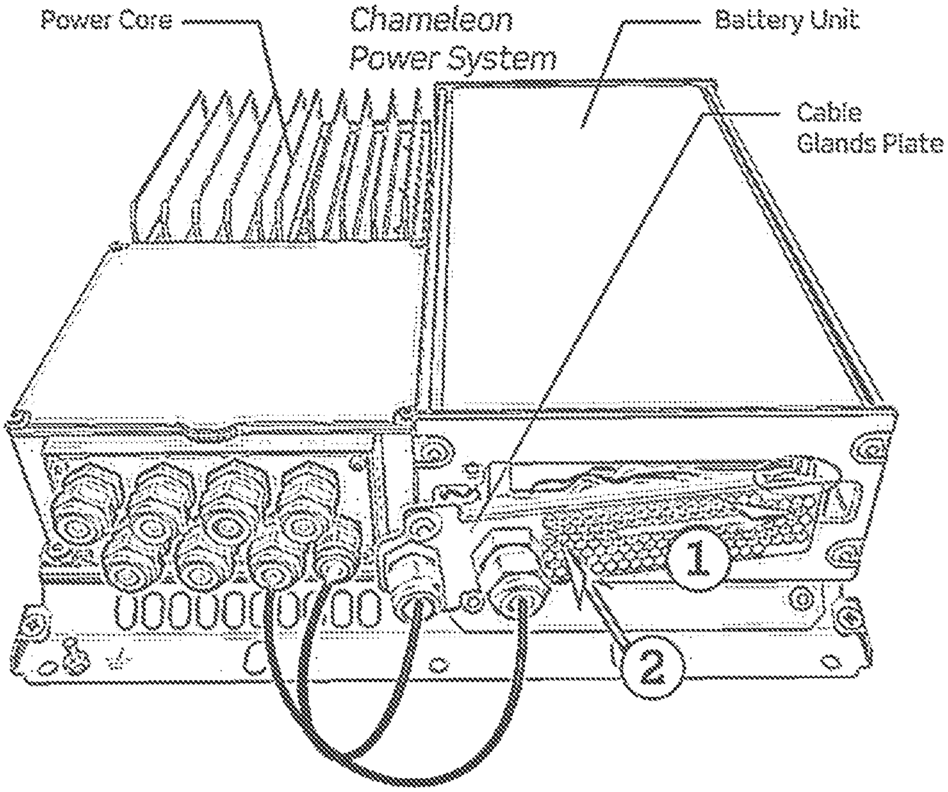
Fig. 2c (Prior art)
FIG. 2*c* illustrates a prior art power supply system with two such passively cooled converter modules.
Figure 3A:
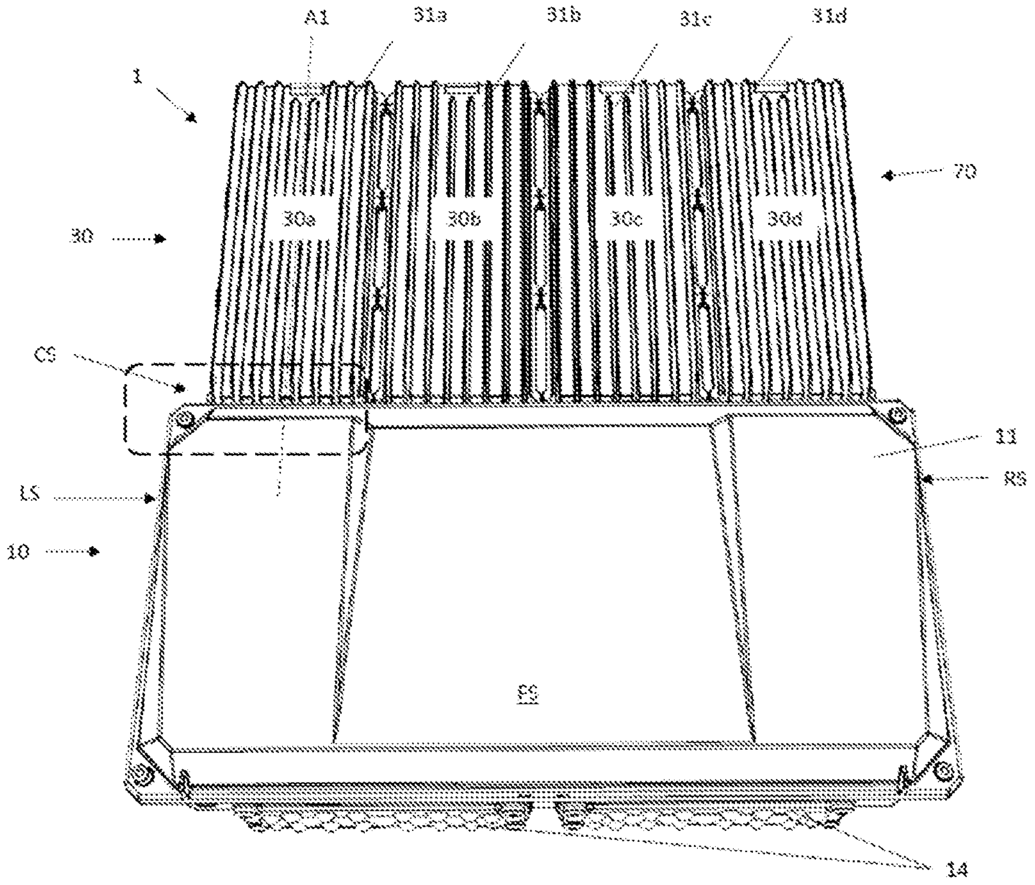
FIG. 3*a* shows a front view of a first embodiment of an outdoor power supply system.
Figure 3B:
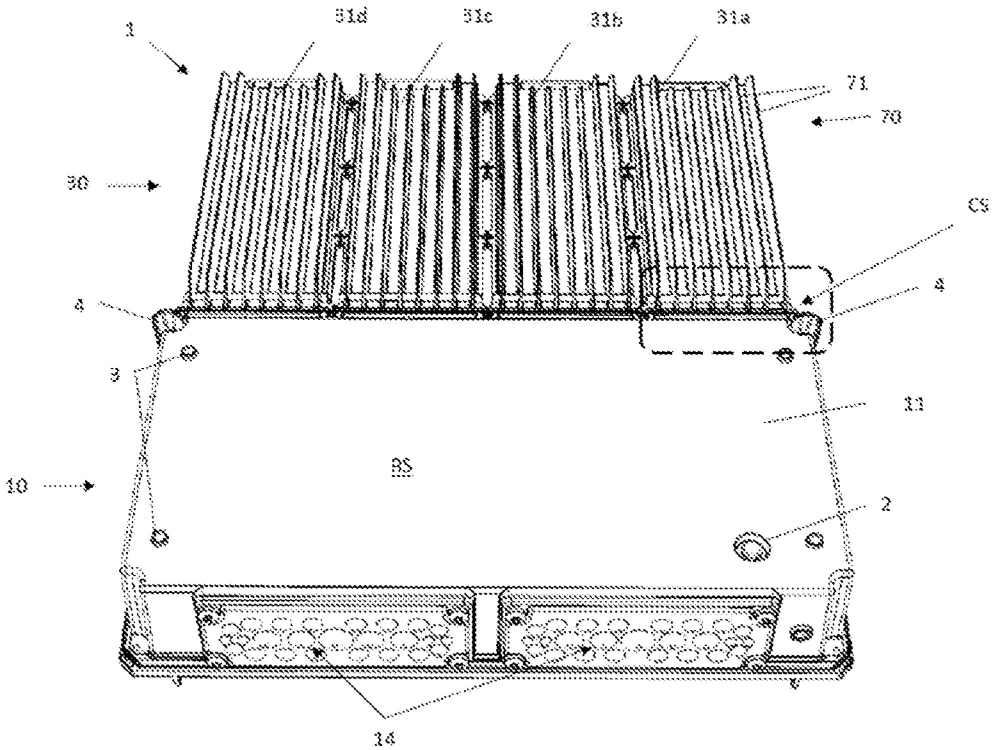
FIG. 3*b* shows a rear view of the first embodiment.

An introduction of the embodiments of the present disclosure will now be described with reference to 3*a*, 3*b*, 4*a* and 4*b*. In FIG. 3*a* and FIG. 3*b*, the front side FS and rear side RS of a power supply system 1 are shown. In one embodiment of the present disclosure, the power supply system 1 includes a main unit 10 including a protective main housing 11 and a distribution circuit 20 disposed in the protective main housing 11. The power supply system 1 further includes a converter module unit 30 including a protective module housing 31 and a converter module 40 disposed in the protective module housing 31. In the drawings, the system includes four such converter module units 30*a*, 30*b*, 30*c*, and 30*d* each including respective module housings 31*a*, 31*b*, 31*c*, 31*d* and converter modules 40*a*, 40*b*. However, the system may include only one, two, three or four such units 30, depending on the expected load connected to the power supply system 1.

The distribution circuit 20 includes cable connectors, circuit breakers/relays, a controller for controlling power through the converter(s), for controlling the output voltage, for battery management etc., while the converter module 40 includes an AC/DC converter, a DC/DC converter, and/or a DC/AC converter, depending on the input power and load requirement. UPS functionality may also be provided by connecting a rechargeable battery to the distribution circuit 20.

Figure 4A:
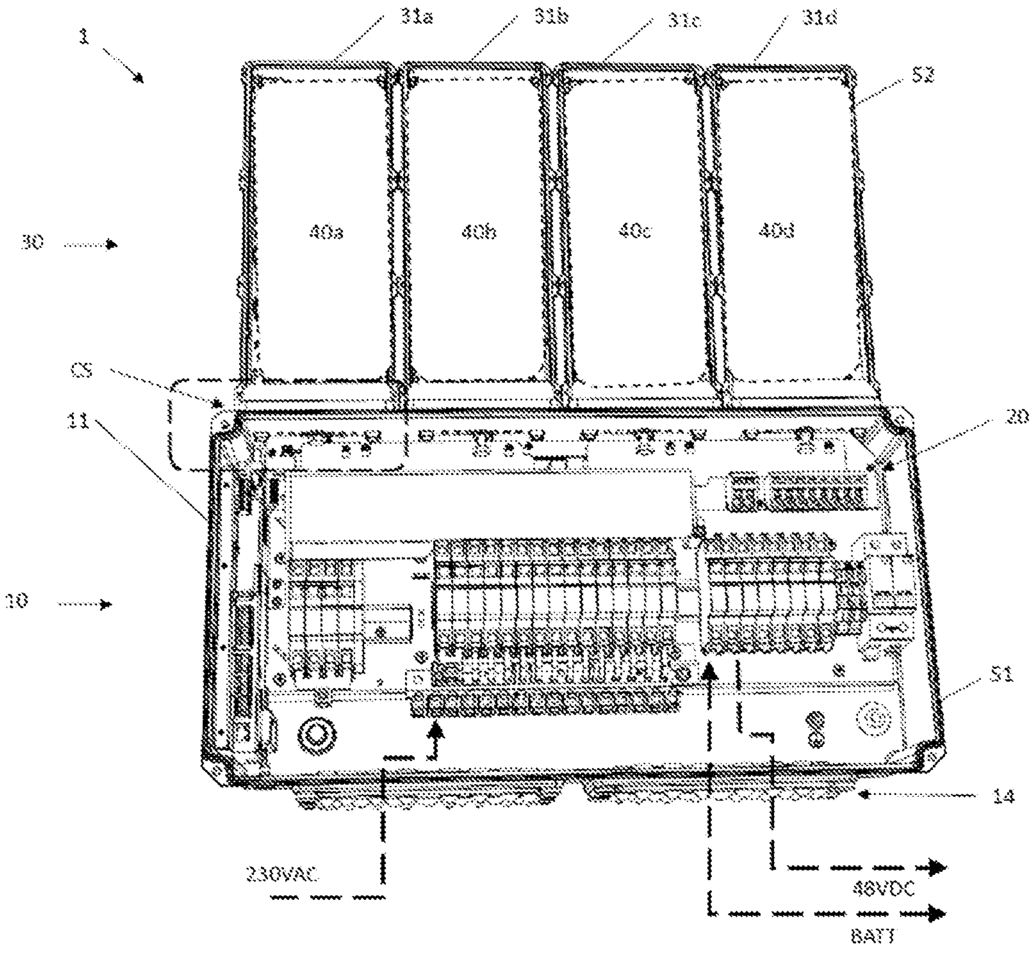
FIG. 4*a* corresponds to FIG. 3, wherein the upper part of the main housing and the upper part of the respective converter module housings have been removed.
Figure 4B:
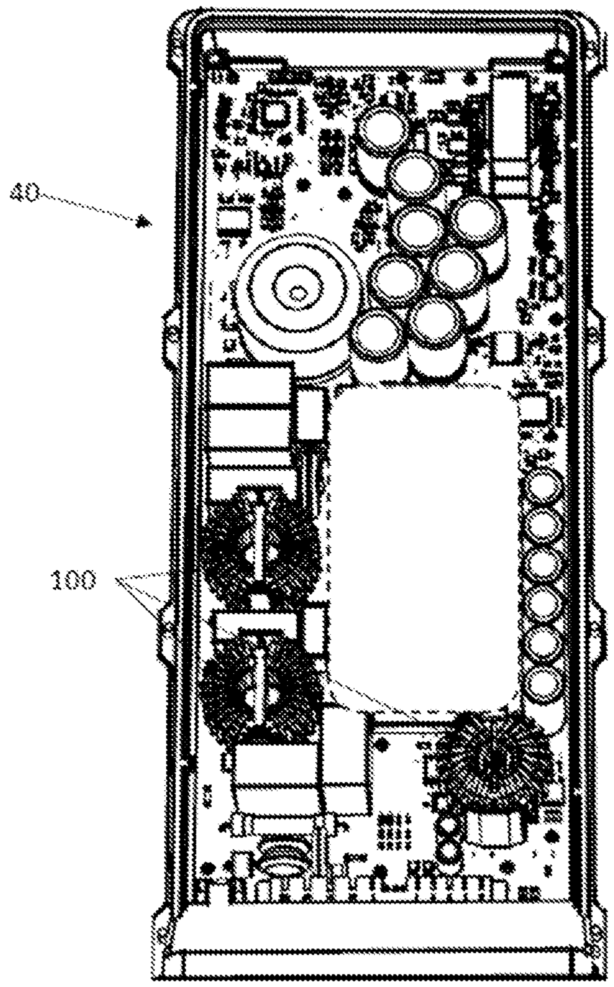
FIG. 4*b* shows an enlarged view of a converter module located within a converter module housing, where three common mode inductors are shown.

In FIG. 4*b*, the printed circuit board PCB of the converter module 40 is shown. It is also shown that the printed circuit board PCB includes three inductors 100 according to one embodiment of the present disclosure, which will be described in detail below. In one embodiment, the three inductors 100 are common mode inductors.

When supplied with electric power, the electric components of the converter module 40, including the inductors 100, produce heat, which must be removed from the inside of the housing 31 to prevent overheating.

The system 1 therefore includes a passive cooling system 70, where the housing 31 is a part of the cooling system, where heat is dissipated from the housing 31 to the environment. The housing 31 is therefore made of a thermally conducting material, such as a metal. In one aspect, the cooling system includes cooling fins 71 provided on the outer surface of the housing 31.

Preferably, the system 1 is designed for outdoor use. In such a case, the housing 31 is a protective housing 31 protecting the inside (i.e. the PCB and the electric components) of the housing 31 from an outdoor environment. The system 1 may for example have an IP65 classification.

Preferably, the housing 31 is made of aluminum or an aluminum alloy. The cooling fins 71 of the passive cooling system 70 may be manufactured together with the converter module housing in a die casting process or a machining process.

Embodiments of the common mode inductor 100 will now be described in detail below.

First Embodiment

It is now referred to FIGS. 5*a-d*. The inductor 100 has three main parts: a core 102, a coil 104, and a supporting device 110. These parts will be described in detail below.

Figure 5A:
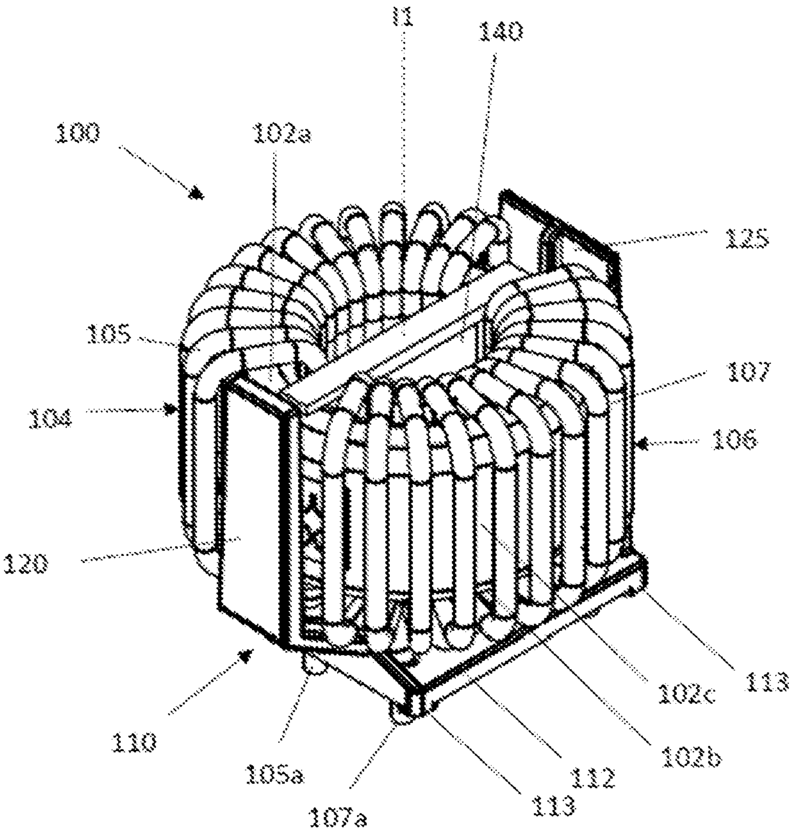
FIG. 5*a* shows a perspective view of a first embodiment of a common mode inductor.
Figure 5B:
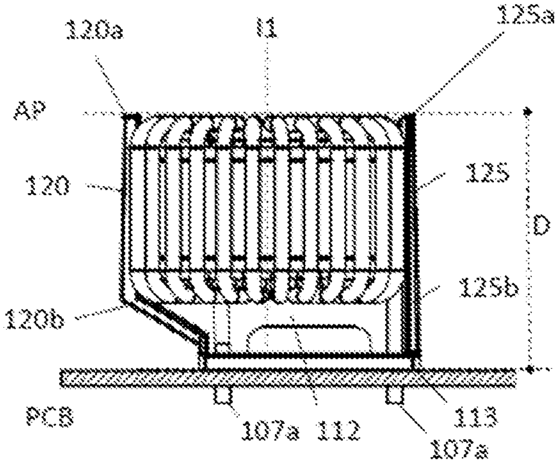
FIG. 5*b* shows a first side view of the inductor of FIG. 5*a;*
Figure 5C:
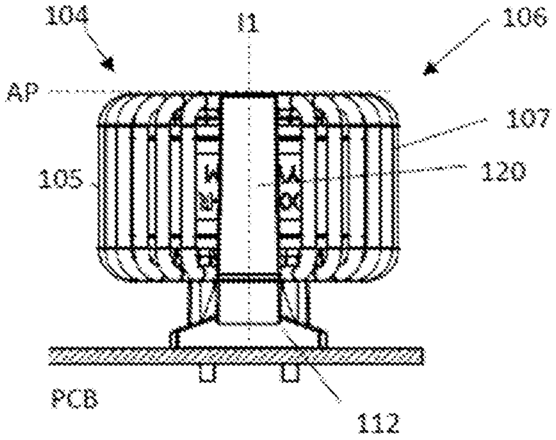
FIG. 5*c* shows a second side view of the inductor of FIG. 5*a;*
Figure 5D:
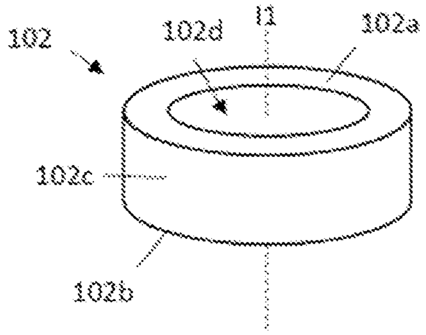
FIG. 5*d* illustrates a perspective view of an embodiment of the core.

The core 102 is shown in FIG. 5*d* and is cylindrical, with a first end plane 102*a* and a second, opposite end plane 102*b* and a longitudinal center axis I1 defined through the opening 102*d* through the core 102. An outer side surface between the first and second end planes is referred to as 102*c*.

Figure 5E:
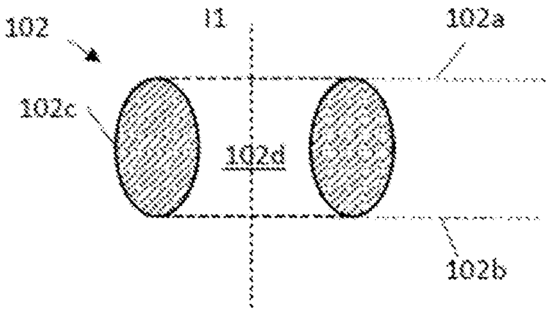
FIG. 5*e* illustrates a perspective view of an alternative embodiment of the core.

An alternative core 102 is shown in FIG. 5*e* and is toroidal, with an oval cross section. The end planes 102*a*, 102*b*, the opening 102*d*, and the outer side surface 102*c* are also indicated in FIG. 5*e*.

Alternatively, the core 102 may be a cylinder with chamfered edges, or it may even be torus-shaped.

The coil 104 includes an insulated wire 105 wound with a number of turns a1, a2, . . . , aN around the core 102. The insulated wire 105 has two ends 105*a* intended to be conductively mounted to the printed circuit board PCB.

In the embodiment, the inductor 100 is a common mode inductor with two coils. Hence, the coil 104 is referred to as a first coil 104, and a second coil is referred to as 106. The second coil 106 includes a second insulated wire 107 wound with a number of turns b1, b2, . . . , bN around the core 102. Also two ends 107*a* of the second wire 107 are intended to be conductively mounted to the printed circuit board PCB.

Figure 8A:
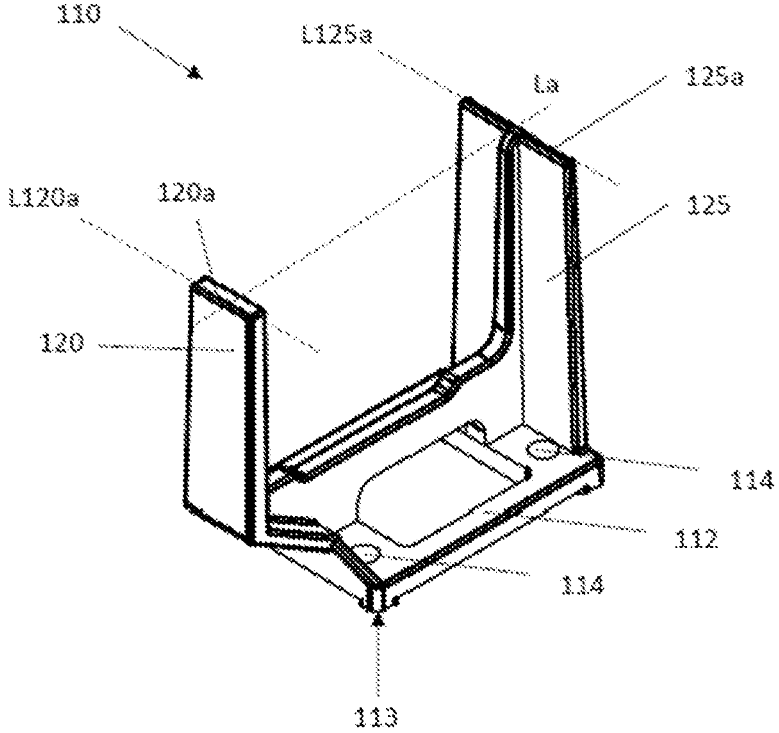
FIGS. 8*a*-8*c* illustrates the supporting device if the inductor shown in FIGS. 5*a-c;*
Figure 8B:
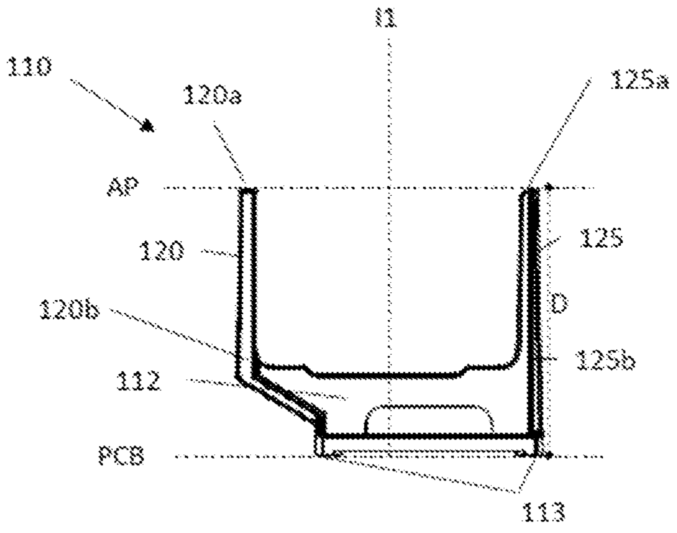
Figure 8C:
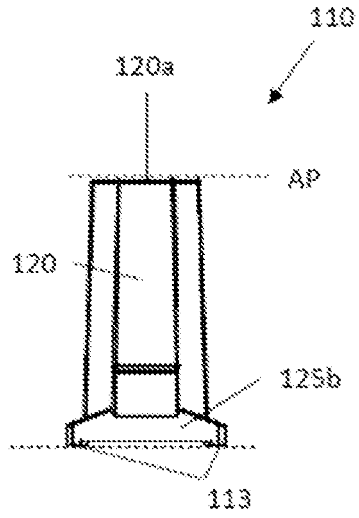
Figure 8D:
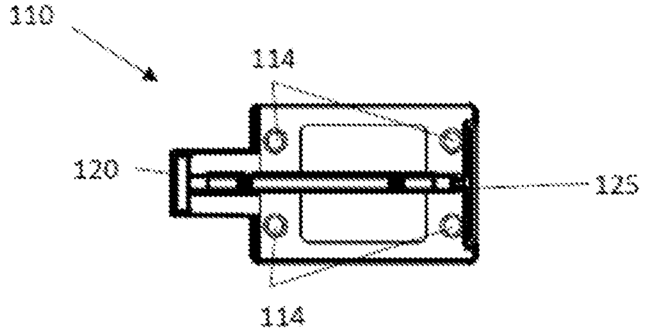
FIG. 8*d* is a top view of the supporting device of FIGS. 8*a-c;*

The present embodiment of the supporting device 110 is shown in FIGS. 8*a* and 8*b*. The supporting device 110 includes a base element 112 having a PCB contacting surface 113. In FIGS. 8*b* and 8*c*, it is shown that the PCB contacting surface 113 includes four legs protruding from the base element 112 towards the dashed line indicating the printed circuit board PCB.

The base element 112 further includes wire guides 114 for guiding ends 105*a* of the first insulated wire 105 of the first coil 104 with respect to the base element 112 and for guiding ends 107*a* of the second insulated wire 107 of the second coil 106. The wire guides 114 may be provided as openings in the base element 112 or as U- or V-shaped notches in the base element 112. The ends 105*a*, 107*a* of the wires 105, 107 are slidingly engaged with the wire guides 114.

The ends 105*a*, 107*a* of the insulated wire 105, 107 are protruding from the base element 112 in a direction away from the alignment plane AP. The ends 105*a* are sufficiently long to penetrate openings of the printed circuit board PCB and to be soldered to the side of the printed circuit board PCB being opposite of the supporting device 110.

The supporting device 110 further includes a first alignment element 120 having a proximal end 120*b* connected to the base element 112 and a distal end 120*a* provided at a distance D (FIG. 8*b*) from the PCB contacting surface 113.

The supporting device 110 further includes a second alignment element 125 having a proximal end 125*b* connected to the base element 112 and a distal end 125*a* provided at a second distance from the PCB contacting surface 113.

In FIG. 8*b*, it is shown that the first and second alignment elements 120, 125 are oriented substantially in parallel with each other. A dashed line La is drawn between the distal ends 120*a*, 125*a*. This dashed line La is provided in parallel with the PCB plane. It is also shown that the distal end 120*a* of the first aligning element 120 is extending (indicated by a dashed line L120*a*) in a direction substantially perpendicular to the dashed line La and similarly, that the distal end 125*a* of the second aligning element 125 is extending (indicated by a dashed line L125*a*) in a direction substantially perpendicular to the dashed line La.

Hence, the distal end 120*a* of the first alignment element 120 and the distal end 125*a* of the second alignment element 125 are defining parallel lines L120*a*, L125*a*. The distal end 120*a* of the first alignment element 120 and the distal end 125*a* of the second alignment element 125 together are defining an alignment plane AP as indicated in FIGS. 8*b* and 8*c*. This alignment plane AP is parallel to the printed circuit board PCB.

As shown in FIGS. 5*a*, 5*b* and 5*c*, the core 102 and the coils 104, 106 are located between the first and second aligning elements 120, 125.

It is also shown that the longitudinal center axis I1 of the core 102 is oriented in parallel with the printed circuit board PCB.

In FIG. 5*a*, it is further shown that the inductor 100 includes a coil separation element 140 for separating the first coil 104 from the second coil 106. The coil separation element 140 sets a separation distance between turns a1, a2, . . . , aN of the first coil 104 from turns b1, b2, . . . , bN of the second coil 106, to avoid an electric short-circuit between the first and second coils. In this embodiment, the coil separation element 140 is provided at least partially inside the opening of the core 102.

Figure 12A:
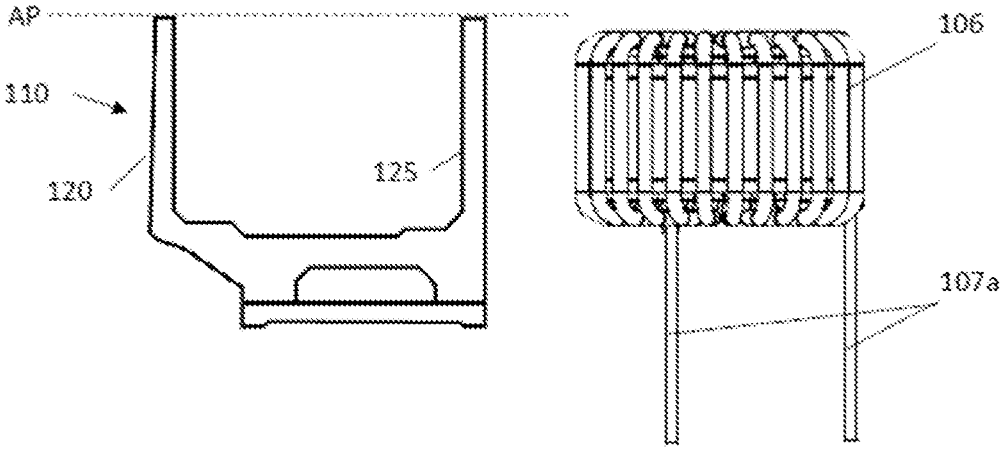
FIGS. 12*a-e* illustrates a method for manufacturing of the common mode inductor of FIGS. 5*a-c*.
Figure 12B:
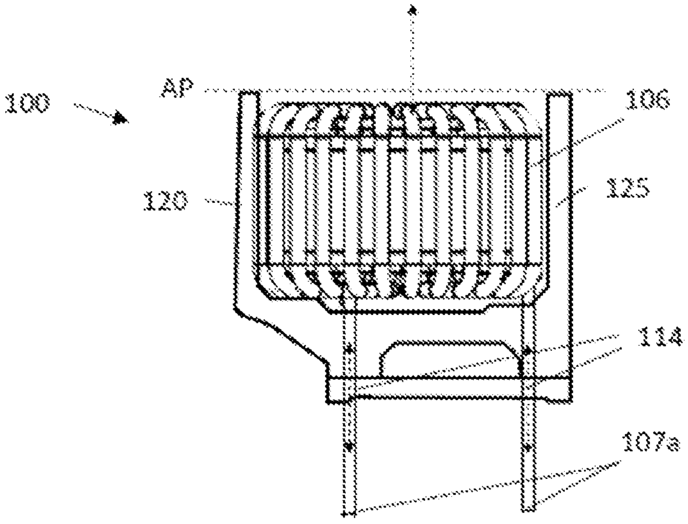
Figure 12C:
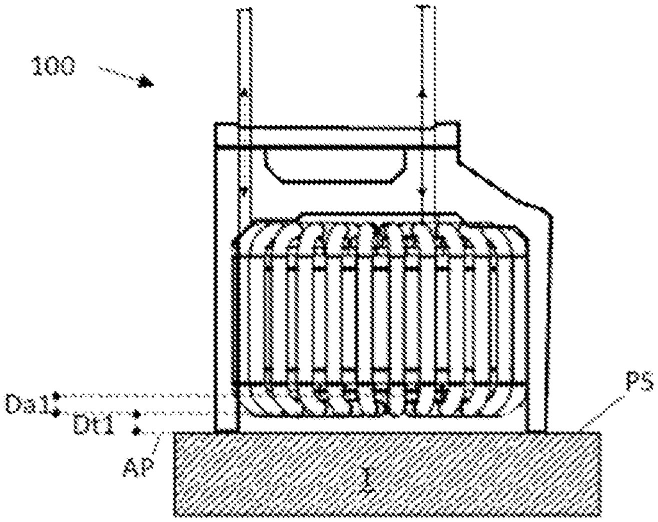
Figure 12D:
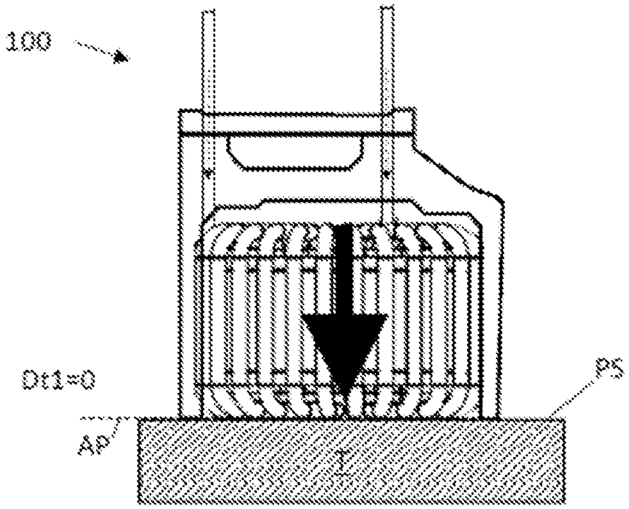
Figure 12E:
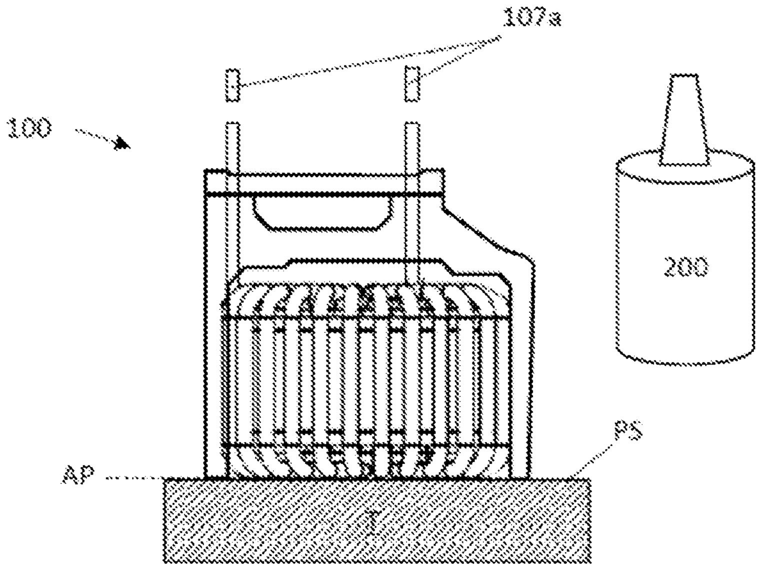

In addition, the core 102, the first coil 104 and the second coil 106 may be fastened to the supporting device 110 by an adhesive (illustrated by an adhesive container in FIG. 12*e*). It should be noted that the adhesive may be in direct contact with the coils and the supporting device 110 only. As the coils 104, 106 are wound around the core 102, the adhesive will indirectly also fasten the core 102 to the supporting device 110. The adhesive 200 may also be used fasten the coil separation element 140 to the coil or coils and/or to the supporting device 110.

First Embodiment—Manufacturing

The manufacturing of the first embodiment of the inductor 100 will now be described.

In a first step, the first insulated wire 105 is wound a number of turns a1, a2, . . . , aN around the core 102, and forming a first coil 104 around the core 102.

In the same way, the second insulated wire 107 is wound a number of turns b1, b2, . . . , bN around the core 102, and forming a second coil 104 around the core 102.

It should be noted that the coils 104, 106 shown in FIG. 5*a* are illustrated by means of a three dimensions (3D) computer program, in which each turn are perfectly aligned with the other turns. In reality, there will be variations between each turn, one reason being the relatively rigid wire 105, 107 of the coils 104, 106. In FIG. 6*c* an image of an inductor 100 is shown, where it is apparent that the two adjacent turns a1, a2 are not perfectly aligned with each other.

It is now referred to FIG. 12*a*. Here the supporting device 110 and the core 102 with its two coils 104, 106 are shown adjacent to each other (only coil 106 shown). It should be noted that the ends 107*a* of the wire 107 are shown to be rather long.

It is now referred to FIG. 12*b*. Here the core 102 and the coils 104, 106 are supported on the supporting device 110 by orienting the first end plane 102*a* of the core 102 facing towards the alignment plane AP and the second end plane 102*b* facing towards the base element 112. The coils 104, 106 are located between the two alignment elements 120, 125. The ends 105*a*, 107*a* of the first insulated wire 105 and the second insulated wire 107 have been inserted into the wire guides 114 of the supporting device 110.

It is now referred to FIG. 12*c*. Here, the inductor 100 corresponds to the inductor shown in FIG. 12*b*, but turned upside down. The alignment plane AP is aligned with a planar surface PS, for example the surface of a table T etc. It is shown in FIG. 12*c* that there is a distance Dt1 between the turns of the coils and the aligning plane AP being larger than zero.

It is now referred to FIG. 12*d*. Here it is shown that the core 102 together with the coils 104, 106 has been pushed towards the planar surface PS until at least one of the turns of one of the coils is abutting the planar surface PS. The distance Td1 is now zero. It should be noted that the—pushing the core 102 together with the coils 104, 106 have been pushed relative to the supporting device 110, as the distal ends 120*a*, 125*a* defining the aligning plane AP is held stationary with respect to the planar surface. This relative movement is allowed as the wires 105, 107 are slidingly engaged with the wire guides 114.

In a final step shown in FIG. 12*e*, the core 102 together with the coils 104, 106 are secured with respect to the supporting device 110. As described above, this may be achieved by adhering the core 102 and/or the coils 104, 106 to the supporting device 110 by means of an adhesive 200. The adhesive will be allowed to cure when the inductor 100 is in the position shown in FIG. 12*e*.

Optionally, the ends 105*a*, 107*a* may be cut off to a suitable length as illustrated in FIG. 12*e*. Alternatively, this can be done after the inductor 100 has been soldered to the printed circuit board PCB.

Figure 6A:
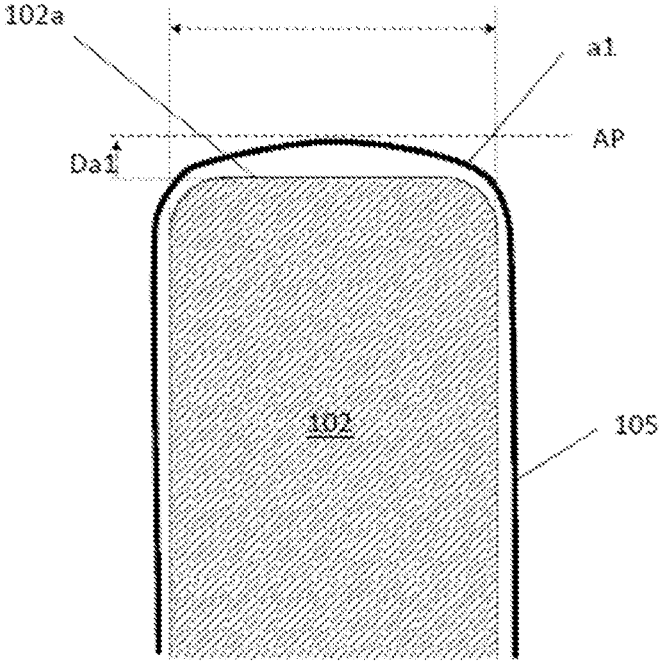
FIG. 6*a* illustrates an enlarged side view of a first turn of a first winding wound around the core.
Figure 6B:
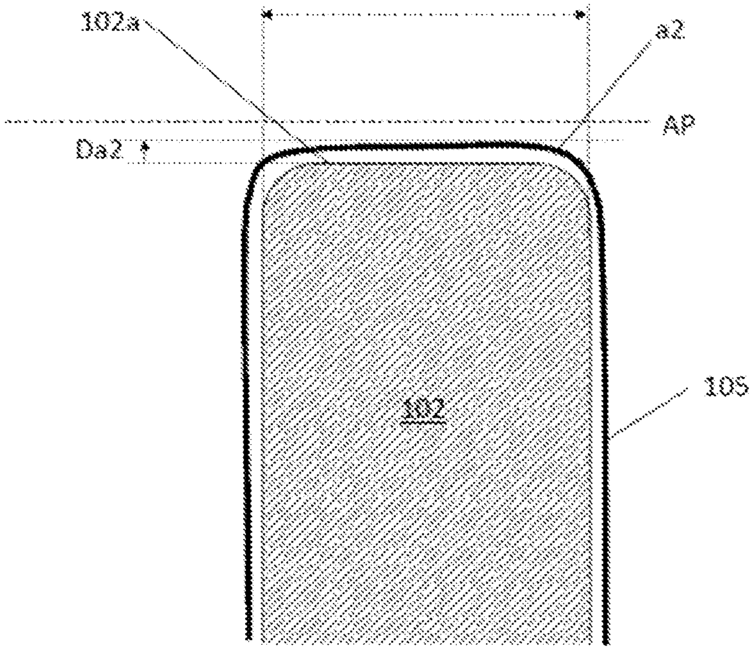
FIG. 6*b* illustrates an enlarged side view of a second turn of the first winding wound around the core.
Figure 6C:
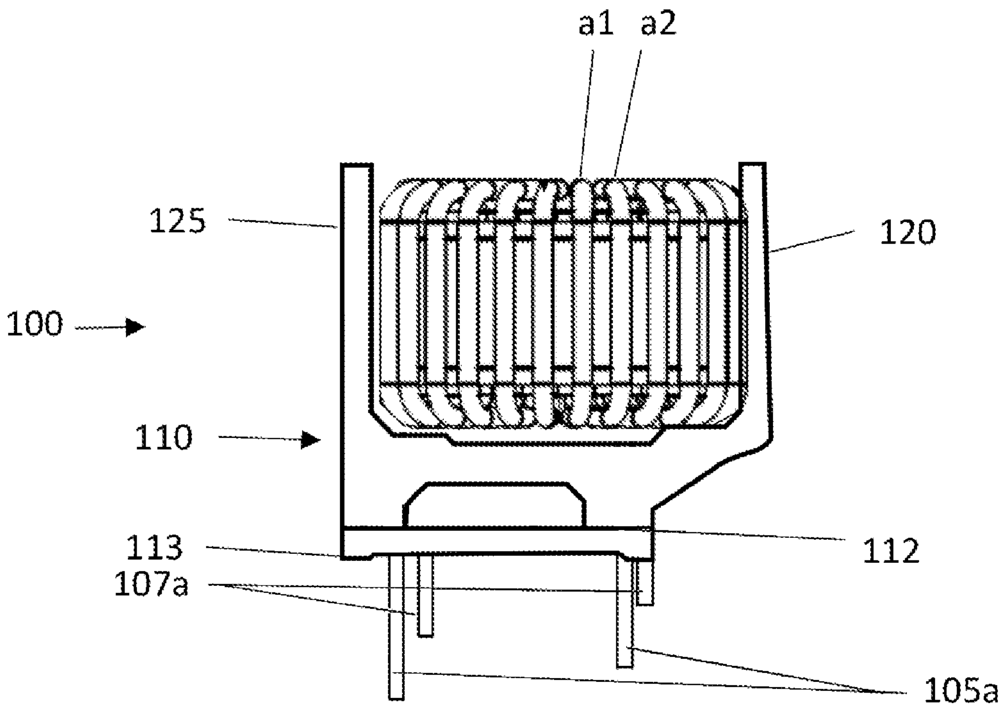
FIG. 6*c* is a photo of a common mode inductor to illustrate the variations of the different turns of the coil.

It is now referred to FIGS. 6*a* and 6*b*. Here, two different turns a1, a2 of the core 104 are shown. Each turn a1, a2, . . . , aN of the first insulated wire 105 has a point furthest from the first end plane 102*a* at a distance Da1, Da2, . . . , DaN in a normal direction towards the alignment plane AP. When comparing FIG. 6*a* with FIG. 6*b*, it is apparent that the turn a1 has the largest distance from the first end plane 102*a*, as the distance Da1 is larger than the distance Da2.

As described above with reference to FIG. 12*d*, the coils 104, 106 (together with the core 102) are pushed towards the planar surface PS until at least one of the turns of one of the coils is abutting the planar surface PS. In the case of FIGS. 6*a* and 6*b*, the first turn a1 will be abutting the planar surface PS and hence be aligned with the aligning plane AP, while the second turn a2 will not be abutting the planar surface PS. Hence, if the inductor has one coil 104 only, it is the turn having the largest distance Da1, Da2, . . . DaN from the first end plane 102*a* which will be aligned with the alignment plane AP.

Figure 6D:
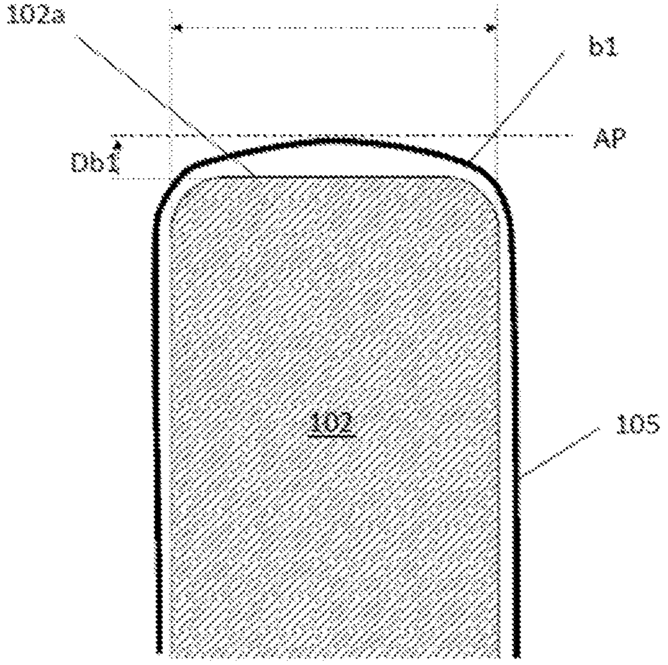
FIG. 6*d* illustrates an enlarged side view of a first turn of a second winding wound around the core.
Figure 6E:
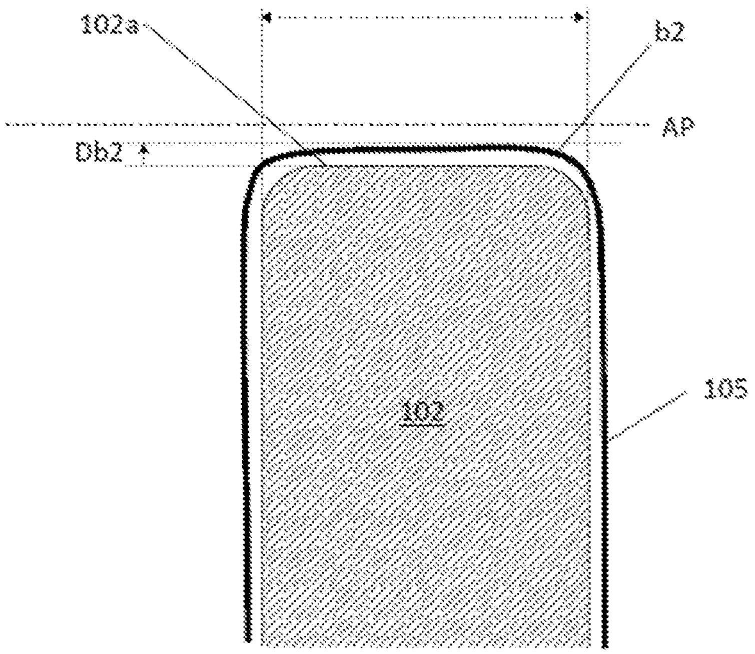
FIG. 6*e* illustrates an enlarged side view of a second turn of a second winding wound around the core.
Figure 7A:
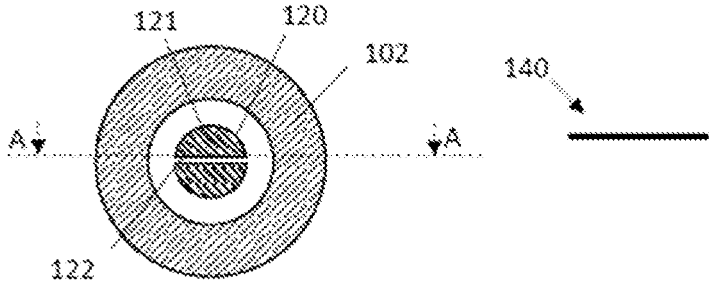
FIG. 7*a* illustrates a cross sectional top view along line B-B in FIG. 7*b* of parts of a second embodiment of the inductor.
Figure 7B:
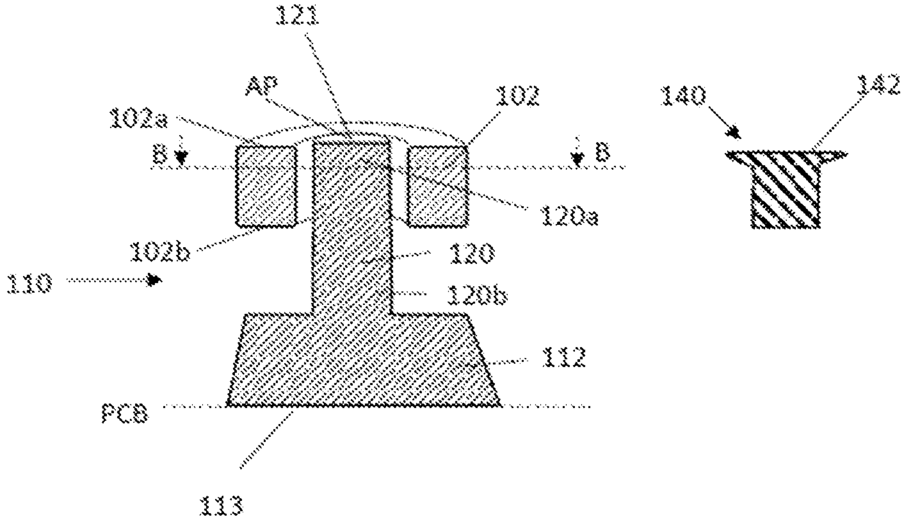
FIG. 7*b* illustrates a cross sectional side view along line A-A in FIG. 7*a* of parts of a second embodiment of the inductor.
Figure 7C:
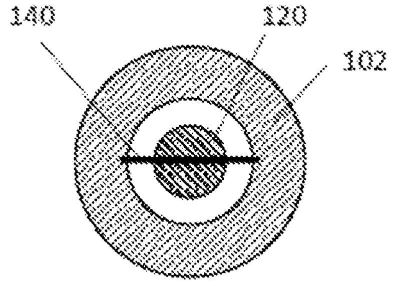
FIG. 7*c* corresponds to FIG. 7*a*, where the coil separation element has been positioned.
Figure 7D:
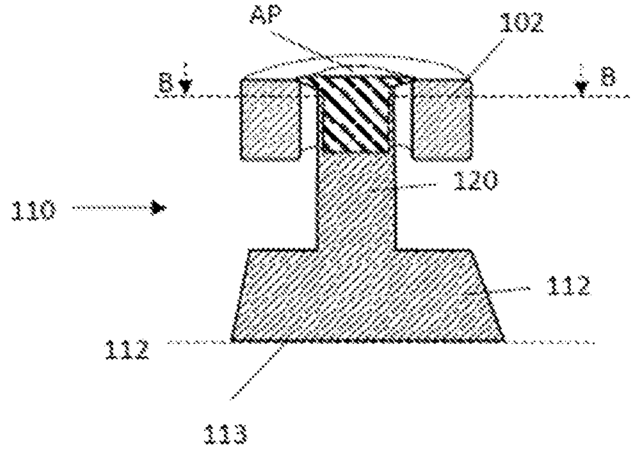
FIG. 7*d* corresponds to FIG. 7*b*, where the coil separation element has been positioned.

It is now referred to FIGS. 6*d* and 6*e*. Here, two different turns b1, b2 of the core 104 are shown. Similar to FIGS. 6*a* and 6*b* described above, it is apparent that the turn b1 has the largest distance from the first end plane 102*a*, as the distance Db1 is larger than the distance Db2.

Hence, in case the inductor 100 has two coils 104, 106, it is the turn having the largest distance Da1, Da2, . . . DaN, Db1, Db2, . . . , DbN from the first end plane 102*a* which will be aligned with the alignment plane AP.

In practice, some of the turns may have the same distance from the planar surface 102 and hence more than one of the turns of the same coil or of different coils may be aligned with the aligning plane AP.

It may also be the case that the step of pushing the core 102 and the first coil 104 will cause a reduction in the distance Da1, Da2, . . . , DaN, Db1, Db2, . . . , DbN of at least one of the turns a1, a2, . . . , aN, b1, b2, . . . , bN of the first insulated wires 105, 107. This will typically require a deformation of the wires 105, 107.

Second Embodiment

It is now referred to FIG. 7*a-d*. Here, only the supporting device 110 and the core 102 is shown, the coil or coils are not shown.

Also here, the supporting device 110 includes a base element 112 and a PCB contacting surface 113. However, the supporting device 110 here only includes one single alignment element 120. This one single alignment element 120 must here have a distal end 120*a* extending in two different directions, i.e. the distal end 120*a* must itself define the alignment plane AP.

Here, the one single alignment element 120 is provided through the opening 102*d* of the core 102. The end surface 121 defining the alignment plane AP is substantially circular. It is also shown that the alignment element 120 includes a slit 122 in its distal end, the slit 122 being adapted to receive the separation element 140.

The coil separation element 140 includes an aligning surface 142, which will be aligned with the alignment plane AP during the manufacturing step of pushing the coil (together with the core) against the planar surface PS.

Third Embodiment

Figure 9A:
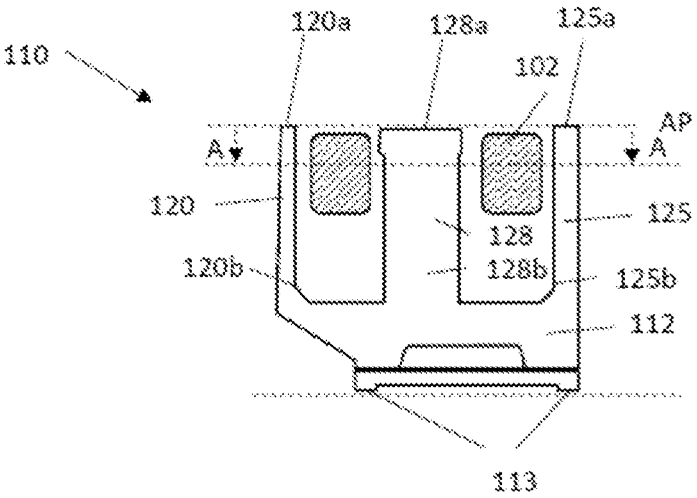
FIG. 9*a* illustrates a side view of a further embodiment of a supporting device.
Figure 9B:
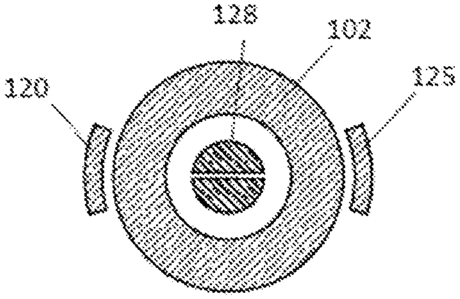
FIG. 9*b* illustrates a cross sectional top view along line A-A of FIG. 9*a;*

It is now referred to FIGS. 9*a* and 9*b*. Here, the supporting device 110 further includes a third alignment element 128 having a proximal end 128*b* connected to the base element 112 and a distal end 128*a* provided at a third distance from the PCB contacting surface 113, where the distal end 120*a* of the first alignment element 120, the distal end 125*a* of the second alignment element 125 and the distal end 128*a* of the third alignment element 128 together are defining the alignment plane AP.

The third alignment element 128 is here provided through the opening 102*d* of the core 102, similar to the second embodiment above. Hence, this third embodiment may be seen as a combination of the first and second embodiment above.

Fourth Embodiment

Figure 10:
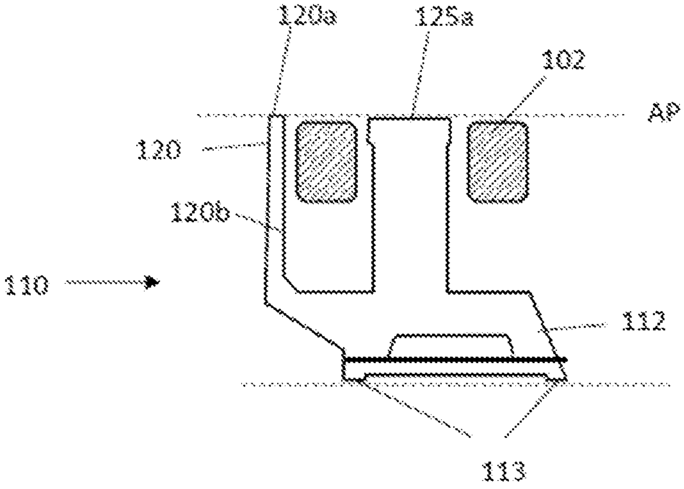
FIG. 10 illustrates a side view of a further embodiment of a supporting device together with the core.

It is now referred to FIG. 10. Here, the supporting device 110 includes two alignment elements 120, 125, where one of the two alignment elements is provided through the opening 102*d* of the core 102, similar to the second embodiment above.

The distal end 120*a* of the first alignment element 120 and the distal end 125*a* of the second alignment element 125 together are defining the alignment plane AP.

Fifth Embodiment

Figure 11:
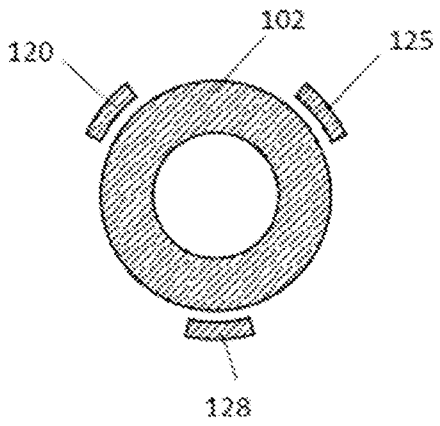
FIG. 11 illustrates a cross sectional top view of a further embodiment of a supporting device together with the core.

It is now referred to FIG. 11. Here, the supporting device 110 includes three alignment elements 120, 125, 128, all of then provided radially outside of the core 102 as shown in FIG. 11.

The distal end 120*a* of the first alignment element 120, the distal end 125*a* of the second alignment element 125 and the distal end 128*a* of the third alignment element 128 together are defining the alignment plane AP.

As is apparent from the above embodiments, there are several ways that such an alignment plane AP can be defined by means of one or more distal ends of one or more supporting elements.

In the above embodiments, the supporting device 110 is made as one, single body. It may be made of a non-conducting material, such as a plastic material. Alternatively, the base element 112 and the alignment element(s) may be made as separate bodies fixed to, or secured to, each other.

According to the above, the purpose of the supporting device 110 is to support the core 102 and the coil(s) with respect to the printed circuit board PCB. A further purpose is to support the core 102 and the coils in a preferred position with respect to the printed circuit board PCB and also with respect to a cooling surface, the cooling surface being located at a distance from the printed circuit board PCB.

Figure 13:
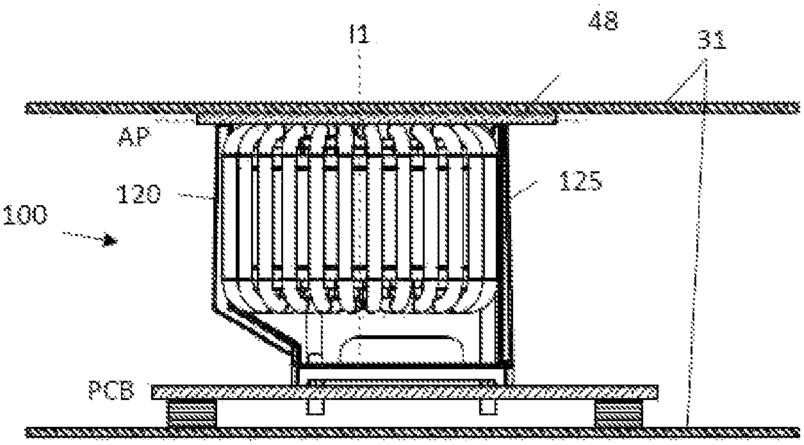
FIG. 13 illustrates the common mode inductor and its location within the module housing.

One embodiment of the present disclosure provides an electric circuit system achieved by using the inductor 100 shown in FIG. 13, where the cooling system provided by means of the housing 31 is illustrated below and above the inductor 100. The inductor 100 here has been conductively mounted to a printed circuit board PCB. As shown, the electric circuit system includes a thermally conducting material 48 located substantially in the alignment plane AP between the inductor 100 and the protective housing 31. In one embodiment, the thermally conducting material 48 is a thermally conductive pad. The thermally conductive pad 48 has been provided between the inductor 100 and the inside of the upper housing 31, to improve heat transfer from the inductor 100 to the upper housing 31.

According to the above inductor and method for manufacturing of such an inductor, it is achieved that none of the turns a1, a2, . . . , aN, b1, b2, . . . , bN is protruding further away from the first end plane 102*a* than the alignment plane AP. Hence, all inductors 100 will fit in its assigned position between the printed circuit board and an outer housing and none of the inductors will prevent the assembly of the electric circuit system.

Due to the alignment of the coil(s) with the alignment plane AP, it is achieved that fewer or thinner pads may be used. Moreover, it is achieved that the variation between different inductors is reduced.

Alternative Embodiments

It should be noted that if the inside of the housing is inclined, i.e. not parallel with, the printed circuit board PCB, then the alignment plane AP may also be inclined with respect to the PCB plane.

It would be possible to integrate the coil separation element 140 with the supporting device 110, i.e. that the coil separation element 140 is provided as part of the supporting device 110.

It should be noted that the inductor 100 may have one, two or more than two coils wound around the core 102.

What is claimed is:

1. A common mode or differential mode inductor for connection to a printed circuit board (PCB); wherein the inductor comprises:

a cylindrical or toroidal core having an opening;

a first coil comprising a first insulated wire wound with a number of turns around the core through the opening;

a supporting device for supporting the core and the first coil;

wherein the supporting device comprises:

a base element having a PCB contacting surface and wire guides provided as openings or notches in the base element for guiding ends of the first insulated wire of the first coil with respect to the base element; and a first alignment element having a proximal end connected to the base element and a distal end provided at a distance from the PCB contacting surface, where the distal end is defining an alignment plane;

wherein the core has a longitudinal center axis defined through the opening and perpendicular to the PCB contacting surface;

wherein the core has a first end plane and a second end plane, wherein the first end plane is facing the alignment plane; wherein the second end plane is facing the base element;

wherein each turn of the first insulated wire has a point protruding away from the first end plane by a distance in a normal direction towards the alignment plane.

2. The common mode or differential mode inductor according to claim 1, wherein the ends of the first insulated wire are slidingly engaged with the wire guides.

3. The common mode or differential mode inductor according to claim 1, wherein the inductor comprises:

a second coil comprising a second insulated wire wound with a number of turns around the core;

wherein each turn of the second insulated wire has a point protruding away from the first end plane by a distance in a normal direction towards the alignment plane, wherein the turn having the largest distance from the first end plane is aligned with the alignment plane.

4. The common mode or differential mode inductor according to claim 1, wherein at least one of the core, the first coil and a second coil are fastened to the supporting device by an adhesive.

5. The common mode or differential mode inductor according to claim 1, wherein the supporting device further comprises:

a second alignment element having a proximal end connected to the base element and a distal end provided at a second distance from the PCB contacting surface, where the distal end of the first alignment element and the distal end of the second alignment element together are defining the alignment plane.

6. The common mode or differential mode inductor according to claim 1, wherein the supporting device comprises one single alignment element, wherein the distal end of the one single first alignment element comprises an end surface defining the alignment plane.

7. The common mode or differential mode inductor according to claim 5, wherein the supporting device further comprises:

a third alignment element having a proximal end connected to the base element and a distal end provided at a third distance from the PCB contacting surface, where the distal end of the first alignment element, the distal end of the second alignment element and the distal end of the third alignment element together are defining the alignment plane.

8. The common mode or differential mode inductor according to claim 1, wherein the ends of the first insulated wire are protruding from the base element in a direction away from the alignment plane.

* * * * *